ABSTRACT OF THE DISCLOSURE

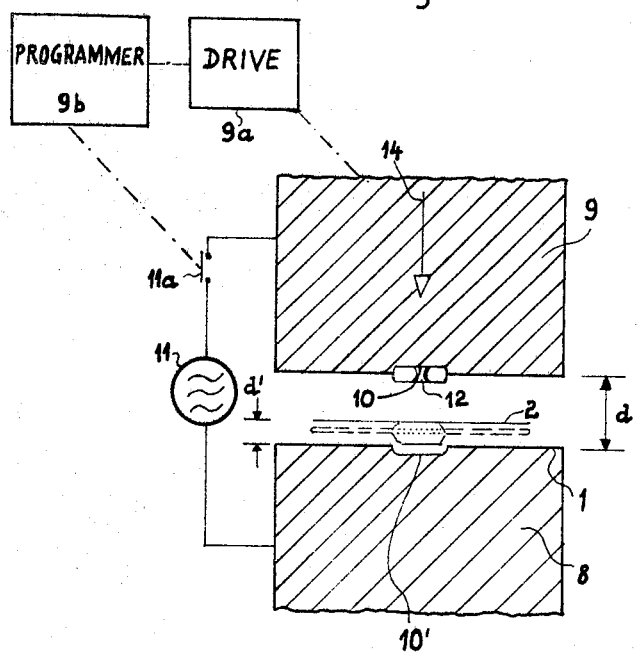
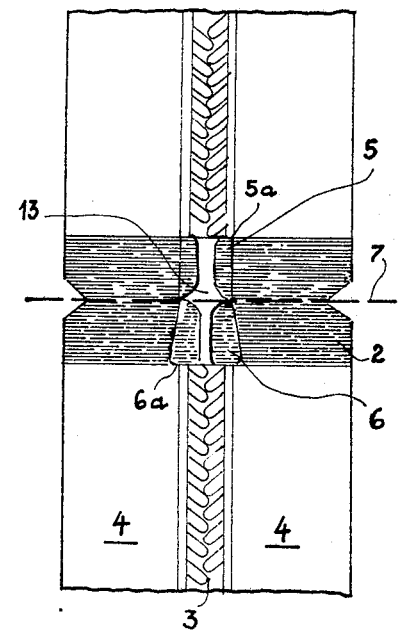
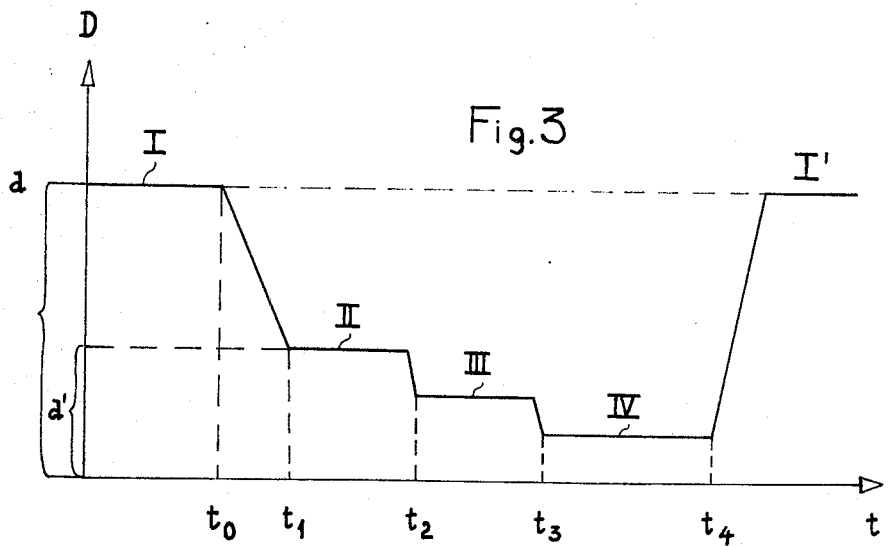
INVENTOR.
HELMUT HEIMBERGER
BY Karl J. Ross
Attorney 3,510,379
PROCESS AND APPARATUS FOR THE PRODUCTION OF SLIDE FASTENERS
Helmut Heimberger, Essen, Germany, assignor to Opti-Holding AG, Glarus, Switzerland, a corporation of Germany
Filed Apr. 20, 1966, Ser. No. 543,974
Claims priority, application Germany, Apr. 23, 1965,
O 10,815
Int. Cl. A41h *37/06;* A44b *19/36*
U.S. Cl. 156—221       2 Claims

A method of and apparatus for the formation of slide-fastener stringers with molded end-stop members in which a thermoplastic foil is heated at least to its flow temperature dielectrically in the absence of pressure. Only after such heating is the foil applied under pressure to the stringer and the desired end-stop formations are molded therein in a series of discrete stages with immobilization of the shaping member between these stages.

---

My present invention relates to improvements in a process and an apparatus for the serial production of slide fasteners of the type in which a pair of slide-fastener coupling elements, generally composed of a thermoplastic material and extending along mating edges of respective slide-fastener halves, are provided at spaced-apart locations with so-called "end" stops or elements of a thermoplastic material. More particularly, this invention relates to an improved system for forming the end-stop members and applying them to slide-fastener strips.

In the commonly assigned copending applications Ser. Nos. 472,953 and 473,003, filed July 19, 1965 (now U.S. Pats. No. 3,353,256 and No. 3,340,594), there are described improved techniques in the finishing of slide fasteners which are severed from a substantially continuous slide-fastener strip consisting of mating or connectable slide-fastener halves by the application at spaced-apart locations of a thermoplastic foil to the strip, molding end elements of any desired configuration from this foil by compressing it at an elevated temperature with the aid of a die arrangement of some other stamping device, and concurrently or subsequently severing the foil members to separate the end-stop elements of adjoining slide fasteners from one another.

When reference is made herein to a "slide fastener" it will be understood that this expression identifies the completed unit which, in conventional fashion, may include a pair of selectively separable slide-fastener halves having mating coupling elements extending along the adjoining longitudinal edges of the slide fastener and fixed to respective support strips or "tapes." At one end of the slide fastener, the slide-fastener halves may be joined together by a bridging type of end-stop member while the other extremity of the slide fastener may be provided with a similar end-stop element, a pair of end-stop elements individual to the slide-fastener halves and permitting spreading of the open slide fastener, or a pair of complementary end-stop members which may be interconnected for closure of the slide fastener. A "slider" engages and is displaceable along the coupling elements and is so shaped that movement of the slider in one direction forces the coupling elements into interfitting and mating relationship whereas movement of the slider in the opposite direction spreads the coupling elements apart. The coupling elements themselves can be coils of a monofilament and oriented polymeric material (e.g. nylon) of helical or elliptical configuration, links of undulating configuration having interfitting heads, a multiplicity of spaced-apart but discrete bodies with a spacing corresponding to the head of the complementary body to be received (of the adjoining slide-fastener half) or the like.

When slide fasteners have been provided hitherto with end-stop members from synthetic resin (e.g. a thermoplastic foil ), the practice has been to feed the foil strip to a setting location, severing the desired length of foil from this strip, applying the foil section from above or below to the slide-fastener strip, and heating the section to fuse it to the support band or tape, the fastener elements being generally composed of thermoplastic material. The die arrangement for shaping the foil to the desired configuration of the end-stop member, which must be designed to intercept the slider and prevent it from being withdrawn from the fastener, were thus provided with recesses and embossing formations and were capable of shaping the end-stop member concurrently with the application of the foil to the slide fastener. In general it can be stated that the resulting end-stop members were effective for the purposes indicated although some technological disadvantages ensued. Firstly, the thermoplastic foil and the thermoplastic portions of the slide fastener in the region at which the foil was applied were heated solely by conduction from the die so that the heating effect was nonuniform at the regions of different thickness of the end-stop members or the assembly. Secondly, the nonuniformity of heating led to nonuniform fusion or bonding of the foil to the substrate (i.e. the body of the slide fastener).

It is, therefore, an important object of the present invention to provide an improved method of bonding thermoplastic foils at spaced-apart locations to a slide-fastener strip and so forming end-stop members for a slide fastener in these foils that a homogeneous adhesion of the end-stop members to the slide fastener is obtainable and nonuniform heating of the assembly is avoided.

A more specific object of this invention is to provide an improved method of and apparatus for the production of slide fasteners having thermoplastic end-stop members.

These objects and others which will become apparent hereinafter have been attained and many of the difficulties involved in prior art systems have been avoided by a method of making slide-fastener assemblies in which a synthetic-resin foil section is applied to a slide-fastener strip and is bonded thereto under heat and pressure with the aid of high-frequency dielectric heating in a particular fashion obviating the problems hitherto encountered in dielectric-heating methods.

In accordance with the improved method of the present invention, the foil is applied to the substrate by dielectric heating between a pair of electrodes and by high-frequency alternating current to a level sufficient to bring the foil to its softening point and, therefore, a temperature at which the foil will bond to the substrate, without application of pressure to the foil. According to this aspect of the present invention, pressure is applied to bond the foil to the slide-fastener substrates only after termination of the dielectric heating of the foil section. The pressure which is then applied to the foil subsequently to its heating simultaneously shapes the foil into the end-stop members and, for this purpose, the electrodes which have initially been held out of forcible contact with the foil section are constituted as dies and, when they contact the foil at elevated pressure, impart the desired configuration of the foil and the slide-fastener assembly.

While it has been proposed heretofore to heat electrically nonconducting members and to bond synthetic-resin foils together (e.g. in a lamination process), such prior-art systems can be equaled with the method of the present invention broadly described above in spite of the irregularities of the embossing faces of the electrodes.

Surprisingly, I have found that the replacement of the flat and planar electrodes with die-forming electrodes, whose surfaces confronting the assembly are irregular, does not render the heating effect nonuniform as one would suppose at first blush but under certain circumstances indeed heats the body in such manner that the subsequent application of pressure, which shapes the foil complementary to the configuration of the die, leads to a uniform bonding of the end members to the substrate in spite of the irregularities present originally in the die face and the variable cross section of the end-stop members subsequent to compression.

While I do not desire to be bound to any theory, it appears that an essential characteristics of the invention is the fact that the dielectric-heating electrodes are spaced sufficiently from one another and from the face of the foil so as to eliminate any effect of thickness in bringing the temperature to at least the softening point of the synthetic-resin foil and even advantageously to the melting point before pressure is applied. The end-stop members applied in this manner can be of any of the aforedescribed types and substantially any construction and may be applied both to synthetic-resin slide fasteners and to metallic/fabric assemblies as desired. A highly advantageous system is known in which the support bands or tapes, the coupling elements and the foil are all composed of thermoplastic synthetic resin.

According to a further feature of this invention, the heating of the synthetic-resin material to its softening or flow point and the compression of the parts to be laminated is effected in two or more successive steps so that the gap between the dielectric material and the electrode can be held sufficiently large during the dielectric heating stage that, in spite of the differences in material thickness, a completely uniform heating is effected. Only when this uniform heating of the material has been completed, does the press stroke finally apply the foil with force to the substrate and bond the parts together while imparting the desired configuration to the end-stop members.

According to the present invention, an apparatus for forming end-stop members of slide fasteners from a slide-fastener strip and a strip of thermoplastic foil comprises a pair of juxtaposed die-forming electrode to compress the foil against the slide-fastener substrate and thereby shape the end-stop members complementarily to the die-forming electrodes. The latter are, consequently, provided with shaping recesses of a configuration corresponding to the end-stop formations and at least one of these electrodes is shiftable in the manner indicated by a drive mechanism co-operating with a control arrangement for holding the electrodes out of pressing engagement with the foil and the slide-fastener assembly at least during the high-frequency heating and for thereupon advancing the movable electrode toward the other electrode upon the termination of the high-frequency heating step.

Advantageously, the movable electrode, which in general terms can be advanced uniformly or nonuniformly, continuously or discontinuously toward the stationary electrode, has a plurality of intermediate stages to which it is advanced intermittently so that, for example, compression of the foil against the slide-fastener assembly in an initial stage suffices to bond the foil to the substrate, while the second or additional stages of advance of the movable electrode carry out the pressing and embossing operation in an optimum manner. It has been found, surprisingly, that the formation of the projections, ribs or like elements of the end-stop members is effected more sharply and with greater definition when the die-forming electrodes are advanced through a plurality of intermediate and fixed steps, with immobilization at each stage for a short period as opposed to continuous advance of the movable electrode.

Among the advantages gained by the present system are the greater adhesion of the end-stop members (both at the starting and terminal extremities of the slide- fastener), a more accurate shaping of the end-stop members, and a greater strength of the end-stop members as a result of the uniformity of heating and the stepwise embossing of the synthetic-resin foils.

The above and other objects, features and advantages of the present invention will become more readily apparent from the following description, reference being made to the accompanying drawing in which:

FIG. 1 is an axial cross-sectional view of the embossing and thermal-bonding section of an apparatus for the production of slide-fastener strips according to the present invention;

FIG. 2 is a plan view of a slide-fastener strip subsequent to the application of a thermoplastic foil and the embossing of this foil in accordance with the principles of the present invention; and FIG. 3 is a time diagram illustrating the sequence of steps involved in the practice of my present invention.

Prior to entering into a detailed discussion of the apparatus of the present invention and the principles of the present method, it may be observed that the apparatus for producing slide-fasteners from a continuous slide-fastener strip by the application of thermoplastic foil has been described and illustrated in the commonly assigned copending applications and patents identified above. The following description relating to the die-forming electrodes will be understood to apply to apparatus of the general type illustrated and described in these copending applications except in so far as the electrode structures and advancing means are concerned. The means for feeding the thermoplastic sections to the thermal-bonding location, the means for severing the slide-fastener strip into respective lengths corresponding to individual slide fasteners, the means for feeding the slide-fastener strip and the foil to the aforementioned location, and the means for applying the slider to the respective slide-fastener length or to the continuous slide-fastener strip may be of the type fully disclosed in these applications and patents.

As illustrated in FIGS. 1 and 2, a continuous slide-fastener strip is formed by a pair of supporting tapes 4 carrying respective coupling elements 3 which are interconnected longitudinally and are separable by a slider in the usual manner. Preferably, the tapes 4 are composed of a synthetic-resin material (advantageously a thermoplastic) while the coupling elements 3 can be constituted of nylon or other oriented polymeric thermoplastic in the form of a helix or undulating chain having mating portions adapted to be urged together by the slider and separable to open the slide fastener. A synthetic-resin foil 2 can be superimposed upon the slide-fastener strip 1 at spaced locations by the method and means of the aforementioned copending applications and patents, the slide-fastener strip and the synthetic-resin foil 2 being then juxtaposed with a pair of die-forming electrodes 8, 9, the latter of which is movable in the direction of arrow 14 by a drive mechanism represented diagrammatically at 9a and controlled by a programmer or stepping switch 9b. The die-forming electrodes 8 and 9 are provided with embossing recesses 10 and 10' as well as a projection 12 adapted to shape two windows 13 and to form ridges 5 and 6 in the end-stop members 5a and 6a which are simultaneously shaped upon closure of the die 8, 9 in a heated condition of the foil 2 and the thermoplastic substrate 3, 4. The members 5a and 6a are separable along the line 7 in the manner described in the aforementioned copending applications and patents to sever the lengths of slide fastener from one another and subdivide the foil into a terminal end-stop member 6a of one slide fastener and the starting end-stop member 5a of an adjacent slide fastener.

The heating of the foil 2 and the thermoplastic synthetic-resin substrate 1, 3, 4 is effected by dielectric means here represented diagrammatically as a high-frequency source 11 connected across the conductive die-forming electrodes 8, 9 via a switch 11a.

In accordance with the principles of the present invention, the high-frequency generator 11 is connected with the electrodes 8 and 9 by closure of switch 11a when the movable electrode is spaced by a distance $d$ from the stationary electrode 8 and the resulting high-frequency field dielectrically heats the foil 2 and the slide-fastener substrate 1. The distance $d$ is large by comparison to the thickness of the dielectric foil 2 and the dielectric substrate 1 so that the differences in heating effect owing to the irregularities of the die-forming recesses and the projections 12 and the varying thicknesses of the substrate and the foil are relatively insignificant and a substantially uniform heating results. No pressure is applied, during this heating stage, to the foil 2 or the slide-fastener strip 1. After the heating has proceeded to raise the temperature of the foil and/or the slide-fastener strip 1 to the softening or fluidity point as indicated earlier, the die-forming electrode 9 is advanced in the direction of arrow 14 (in a stepwise manner as described below), after switch 11a under the control of programmer 9b has disconnected the high-frequency source 11, and the embossing operation then is effected with pressure. The foil 2 is thus bonded to the coupling elements 3 and the support tapes 4 and is simultaneously embossed to produce the end-stop members 5 and 6.

As illustrated in FIG. 3, the programmer 9b advances the die-forming electrode 9 in a stepwise manner and the several times $t_0$, $t_1$, $t_2$, $t_3$ and $t_4$, plotted along the abscissa, represent the successive steps of the end-stop-forming operation. The distances between the juxtaposed faces of the electrode 8, 9 are represented along the ordinate D. Thus the dielectric heating of the foil is effected with an interelectrode spacing $d$ during the period I to the time $t_0$ whereupon the switch 11a is opened and dielectric heating is terminated. Simultaneously, as represented by the slope of the line from stage I to stage II, the movable electrode 9 is advanced during the time interval $t_0$–$t_1$ to the spacing $d8$ from the fixed electrode 8 corresponding substantially to the thickness of the foil and the substrate 1, the foil being then bonded to the substrate. The bonding process continues during the interval between times $t_1$ and $t_2$ represented by stage 11. Thereafter, the movable electrode 9 is advanced further (as shown by the slope of the line terminating at $t_2$ but bridging lines II and III) to commence the embossing operation, the electrodes being held at the intermediate stage (III); after conclusion of this stage the electrode 9 is lowered again ($t_3$) to the final pressurization stage IV which is maintained for a short time $t_3$–$t_4$. The entire interval from $t_0$ to $t_4$ may occupy a matter of several seconds, whereupon the programmer 9b raises the electrode 9 by reversal of the drive 9a; then switch 11a is closed after slide-fastener strip 1 has been advanced in the manner described in the aforementioned patents to repeat the operation as diagrammatically represented. At time $t_4$, the end-stop members have been substantially completely formed and further pressure is not necessary. It will be understood that the expression "embossing" as used herein to refer to the formation of the end-stop elements includes the perforation of the end-stop members via the cutting ridge or edge 12 to form the windows 13. Similar windows have been illustrated and described in the aforementioned patents and serve to receive the sliders or to form separable ends of a slide fastener.

I claim:
1. In a process for producing slide fasteners wherein a pair of elongated, releasably interconnected thermoplastic slide-fastener elements carried on respective supporting tapes are provided with end-stop members by placing a thermoplastic foil across a portion of said elements on said tapes, jointly deforming said foil and said portion, and severing said elements into sections at the deformed portion thereof, the improvement which comprises the steps of:
 (a) positioning an assembly composed of said tapes, said elements and said foil between a pair of electrodes provided with coacting die formations and spaced apart by a distance substantially greater than the thickness of said assembly;
 (b) dielectrically heating said assembly to at least the softening point of the thermoplastic material of said foil and said elements by energizing said electrodes with high-frequency alternating voltage;
 (c) terminating the energization of said electrodes while maintaining same substantially at their original distance; and
 (d) moving said electrodes toward each other and into contact with said assembly to deform same while the latter is still in its heated and softened state.

2. The improvement defined in claim 1 wherein the movement of said electrodes toward each other in step (d) is an intermittent advance of at least one electrode toward the other with intervening halting thereof in contact with the heated assembly.

References Cited
UNITED STATES PATENTS

| | | | |
|---|---|---|---|
| 2,631,646 | 3/1953 | Gannon et al. | 156—380 |
| 2,850,609 | 9/1958 | Siegel | 219—10.53 X |
| 3,001,904 | 9/1961 | Porepp | 156—66 |

JOHN T. GOOLKASIAN, Primary Examiner

J. C. GIL, Assistant Examiner

U.S. Cl. X.R.

156—66, 251, 273, 322, 380; 219—10.53